Dec. 26, 1922.
J. KERNES ET AL.
WOOD TURNING MACHINE.
FILED DEC. 13, 1919.
1,439,900.
3 SHEETS—SHEET 3.
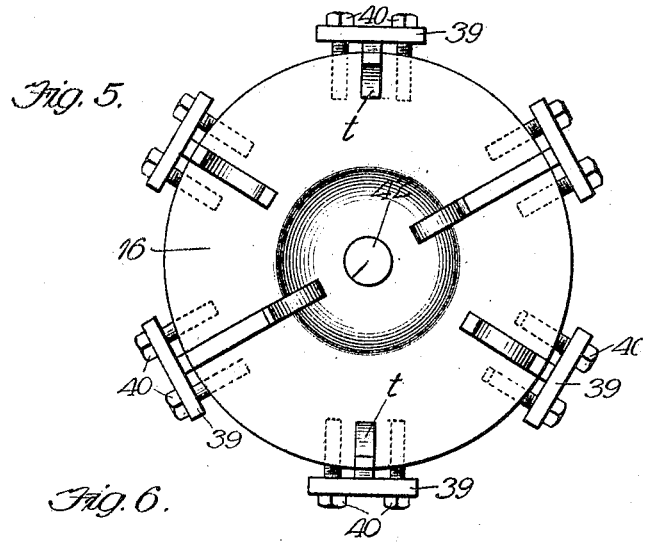
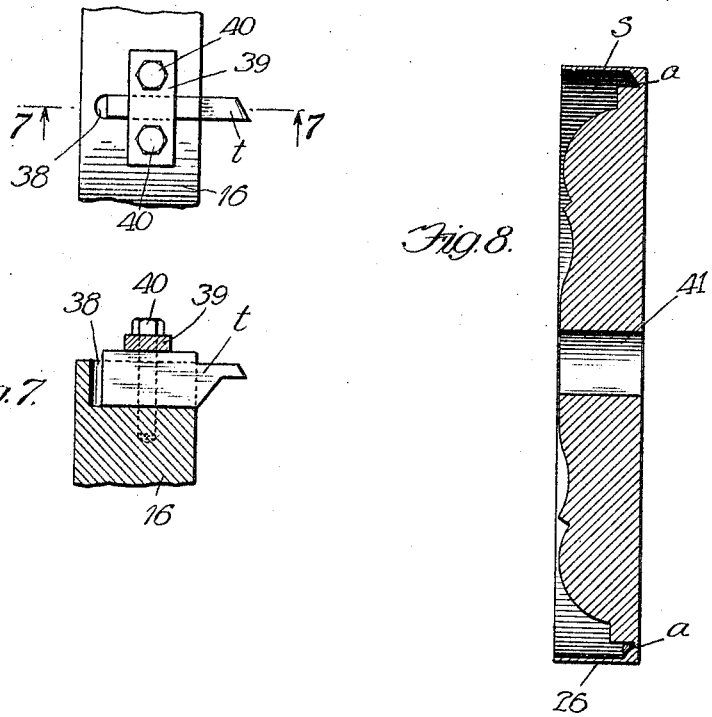
Witness
Martin H. Olsen.
Inventors
James Kernes & Isaak Karish
By Schmidt & Hanson
Atty's.

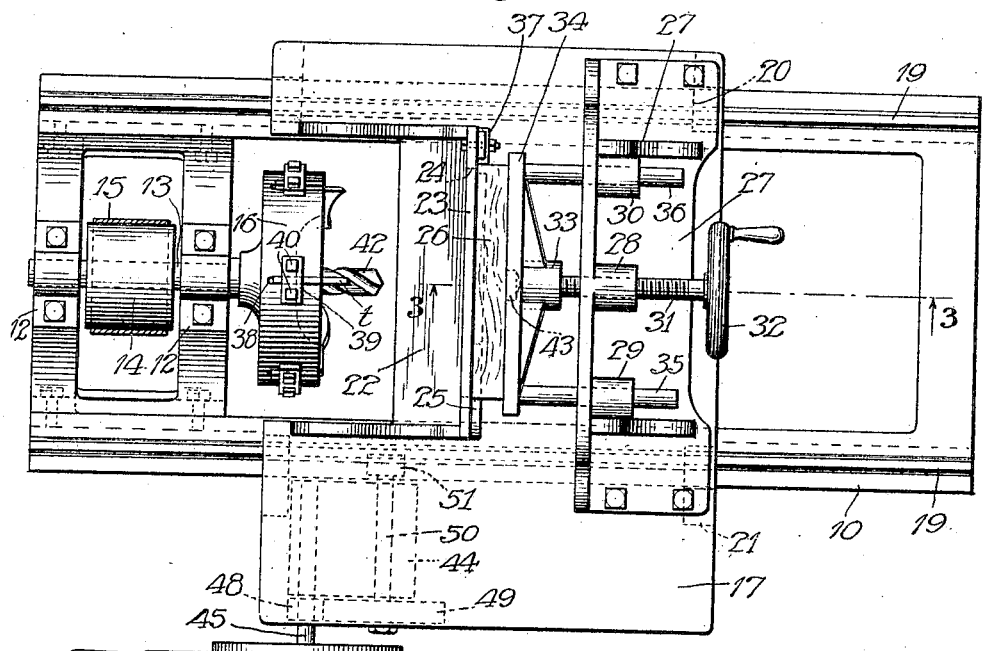

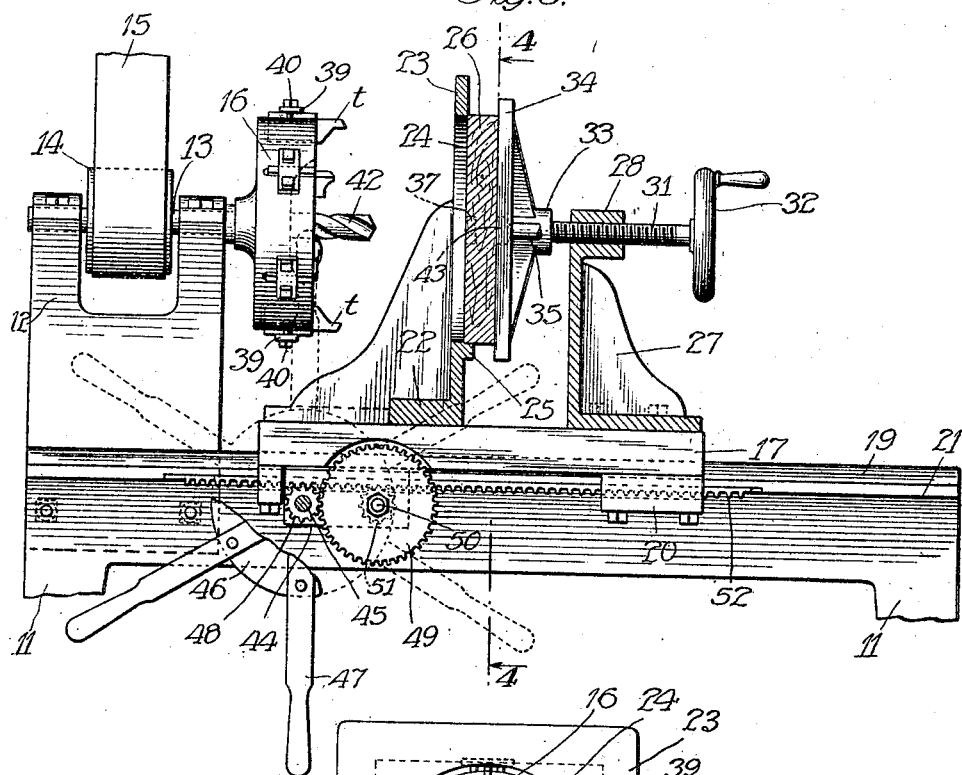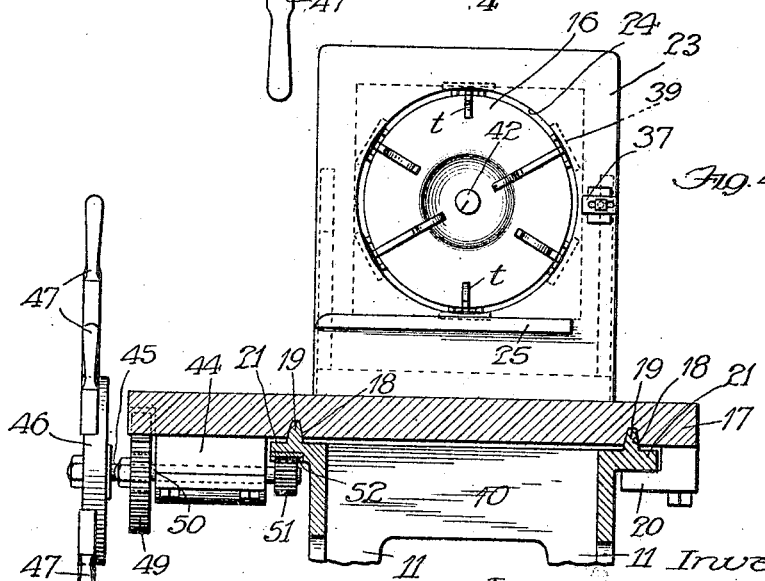

Patented Dec. 26, 1922.

1,439,900

UNITED STATES PATENT OFFICE.

JAMES KERNES AND ISAAK KARISH, OF CHICAGO, ILLINOIS, ASSIGNOR TO KERNES MANUFACTURING CO., OF CHICAGO, ILLINOIS, A CORPORATION OF ILLINOIS.

WOOD-TURNING MACHINE.

Application filed December 13, 1919. Serial No. 344,719.

*To all whom it may concern:*

Be it known that we, JAMES KERNES, a citizen of the United States, residing at Chicago, in the county of Cook and State of Illinois, and ISAAK KARISH, a citizen of Russia, residing at Chicago, in the county of Cook and State of Illinois, have invented certain new and useful Improvements in Wood-Turning Machines, of which the following is a full, clear, and exact description.

Our invention relates to wood turning machines for simultaneously boring, cutting and shaping wood blocks to finished form. Our invention refers particularly to that class of machines in which a rotary tool supporting head is provided on which the various cutting or boring tools are mounted and secured as desired, and a stock feed carriage is provided for supporting the blocks and for carrying it into engagement with the tools.

Among the important objects of our invention are to provide an improved form of tool supporting head and means for securing various tools thereto; to provide improved stock feed carriage mechanism with improved clamping means thereon for clampingly supporting a block to be turned; to provide improved means for shifting the stock feed carriage on its supporting bed; and in general to provide improved, simplified and more efficient mechanism of the class referred to.

A machine incorporating the various features of our invention is shown on the accompanying drawings in which—

Fig. 1 is a plan view,

Fig. 2 is an end view,

Fig. 3 is a side elevational view with the block supporting clamping mechanism in vertical section on plane 3—3, Fig. 1, Fig. 4 is a sectional view on plane 4—4, Fig. 3 with the block removed, Fig. 5 is an enlarged front elevational view of the tool supporting block, Fig. 6 is a side view of a section of said head showing the tool supporting mechanism, Fig. 7 is a sectional view on plane 7—7, Fig. 6, and Fig. 8 is an enlarged diametral sectional view of a finished piece of work in the form of a base.

The supporting structure for the operative parts of the machine is shown in the form of a table 10 mounted on legs 11. At one end of the table is secured the bearing frame 12 in which is journaled the shaft 13 parallel with and extending longitudinally of the table, the pulley 14 being on this shaft and connected by belt 15 with a driving source such as a counter-shaft. The shaft at its inner end serves to support the tool supporting head 16 on which are mounted the various tools for boring, cutting, shaping or otherwise forming blocks.

Slidable on the table 10 is the stock feed carriage 17 in whose base are the channels 18 for receiving the guide ridges 19 on the table. The carriage is held to the table by means of brackets 20 fastened to the under side of the carriage at the sides thereof and engaging below the side flanges 21 of the table. Mounted on the carriage at the inner end thereof is the stock supporting frame 22 whose vertical wall 23 has an opening 24 in axial alignment with the shaft 13 and of a diameter to permit the tools on the head 16 to pass therethrough in engagement with supported blocks. Just below the lower edge of the opening 24 extends the horizontal ledge 25 for supporting a wood or other block 26 behind the opening 24 in position to be acted upon by the tools on the head 16.

At the outer end of the carriage 17 is the standard frame 27 having the central lug 28 and the side lugs 29 and 30. The central lug 28 is threaded to receive a threaded shaft 31 which is turned by means of a hand wheel 32 at the outer end thereof. The inner end of said shaft is journaled in the hub 33 extending from the rectangular clamping plate 34. Arms 35 and 36 extending from the plate at the sides thereof have sliding engagement in the lugs 29 and 30 and serve to guide the plate and prevent its turning when the shaft 31 is rotated to shift said plate horizontally. After a block 26 has been inserted on the ledge 25 the wheel 32 is turned and the plate 34 brought against the block to securely clamp the block against the wall 23 behind the opening 24. An adjustable stop 37 assists in the proper positioning of the blocks with reference to the opening, the blocks being merely slid along the ledge 25 until further movement is prevented by the stop 37.

After insertion of a block from the feed carriage structure the carriage is shifted toward the tool supporting head 16 to permit the supported tools to engage with and form the block. The construction and arrangement of the tool supporting head is clearly shown in Figs. 5, 6 and 7. The head is cylindrical and has a plurality of radially extending slots or pockets 38 in which the various tools *t* are inserted and secured. We have shown ordinary clamping straps 39 for securing the tool in the pocket, the cap being secured to the edge across the tool by screws 40. The cutting ends of the tools are different shapes depending upon the desired shape of the finished work. In Fig. 8 we have shown a finished piece in the form of a base, for example the base of a lamp. This base has the central cylindrical opening or passageway 41 and this is formed by the drill 42 which is secured in an opening provided therefor in the head 16. The drill is preferably longer than the tools in order that it will pass through the block 26 in advance of the tools and serve as additional support for the block, to keep it centered. A recess 43 is preferably provided in the plate 34 for receiving the drill end. The height and width of the block 26 are slightly greater than the longest operation diameter of the tools *t*, in order that sufficient stock *s* (Fig. 8) will remain between the wall 23 and the plate 34 while the block is being cut and formed. The block is cut in the machine to within the thin section *a* of completion (Fig. 8) and the block is then removed from the machine and the surplus stock trimmed off by cutting along the section *a* with a band saw or other tool.

We provide improved simple means for shifting the stock feed carriage along the table 10. In a bearing frame 44 secured to the under side of the carriage is journaled a shaft 45 having at its outer end the hub 46 from which extend the grip spokes 47. The shaft also carries the pinion 48 which meshes with the gear 49 at the outer end of the shaft 50 also journaled in the bearing frame 44. At its inner end the shaft 50 carries the pinion 51 which meshes with the rack 52 secured to the under side of the flange 21 of the table. Upon turning of the hub 46 by means of the grip spokes the pinion 51 is rotated and travels along the rack 52, the feed carriage being thus shifted on the table 10. Owing to the gear reduction the carriage is powerfully and accurately shifted and the block 26 can be applied with precision to the forming tools.

We thus produce a very efficient machine in which blocks of wood or other material may be quickly placed, clamped and then shifted to be cut, bored or otherwise shaped to a desired form by a number of tools applied on a rotating tool carrying head. We do not of course desire to be limited to the exact construction, arrangement and operation shown and described as modifications can no doubt be made which would still come within the scope of the invention.

We claim as follows:

1. In a machine of the character described, the combination of a supporting table, a rotatable cutting head carried and arranged at one end of the table, said table having guideways and a rack secured to the table, a work supporting sliding table mounted upon the first mentioned table, said sliding table including a vertically arranged apertured bracket, the aperture thereof being in alignment with the rotatable cutting head and permitting the head to pass therethrough into engagement with a block supported by the apertured member, another bracket carried by the sliding work support, a clamping head carried by the bracket and provided to clamp the work between it and the vertically arranged apertured member, a pinion cooperating with said rack, a pinion actuating member also carried by the sliding work support, whereby said work support may be moved toward and away from said cutting head.

2. In a machine of the character described, the combination of a supporting table, a rotatable cutting head carried by the table, a sliding member supported by said table, an apertured bracket carried by the sliding member, said aperture permitting the cutting head to pass through said bracket, another stationary bracket carried by the sliding member, a clamping head arranged between said brackets and carried by the last mentioned stationary bracket, means for moving the clamping head relatively to said brackets, means for preventing relative rotation of the clamping head and said brackets, said means permitting movement of the clamping head relatively to said brackets, and means carried by the supporting table and cooperating with the sliding member to move the sliding member together with the brackets and clamping head toward and away from the cutting head.

In witness whereof, we hereunto subscribe our names this 6th day of December A. D., 1919.

JAMES KERNES.
ISAAK KARISH.